E. J. KANE.
DRIVING MECHANISM FOR MOTOR VEHICLES.
APPLICATION FILED FEB. 23, 1918.
1,306,227.
Patented June 10, 1919.
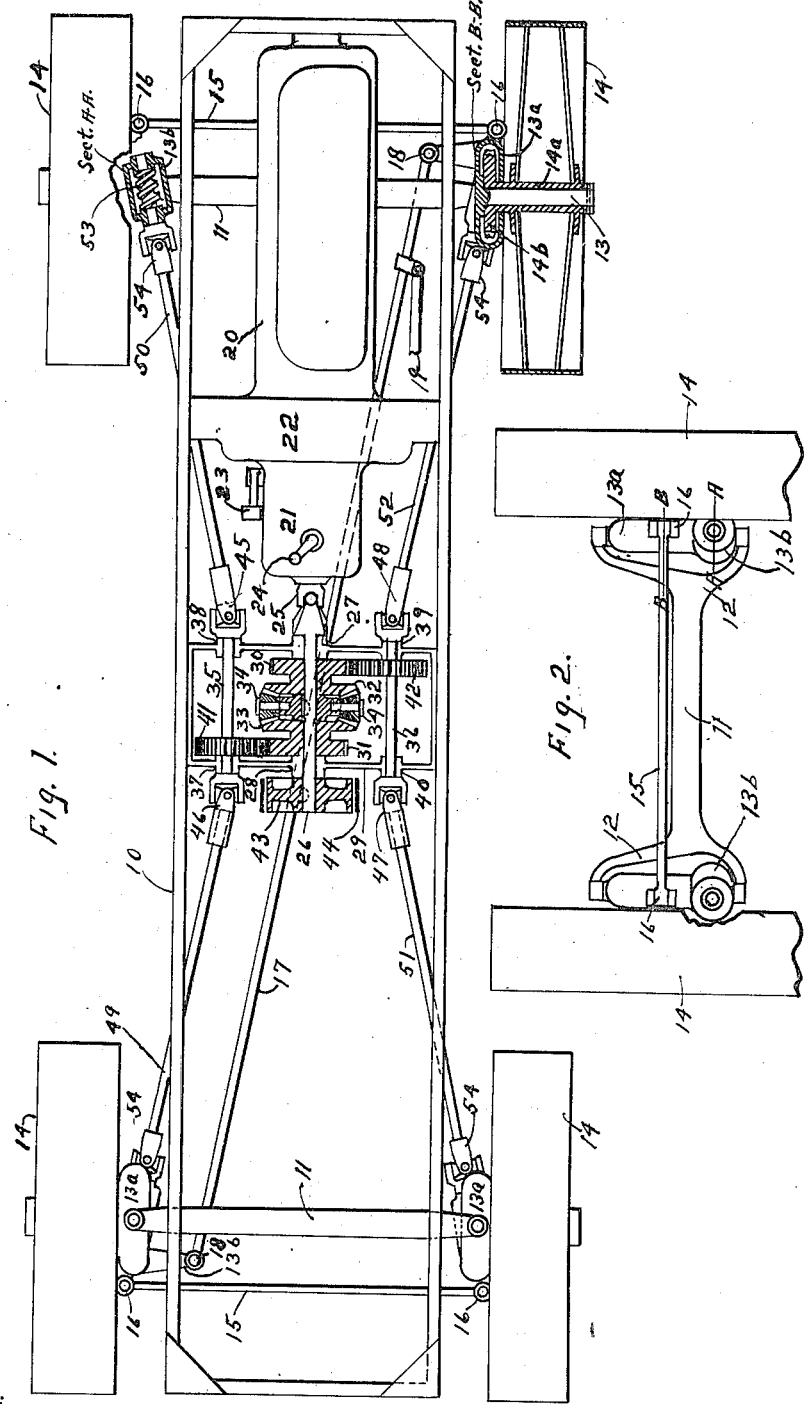

UNITED STATES PATENT OFFICE.

EDMUND JOSEPH KANE, OF CHICAGO, ILLINOIS.

DRIVING MECHANISM FOR MOTOR-VEHICLES.

1,306,227.　　　　　Specification of Letters Patent.　　Patented June 10, 1919.

Application filed February 23, 1918.　Serial No. 218,653.

*To all whom it may concern:*

Be it known that I, EDMUND JOSEPH KANE, a citizen of the United States, residing at Chicago, in the county of Cook and State of Illinois, have invented certain new and useful Improvements in Driving Mechanism for Motor-Vehicles, of which the following is a full, clear, and exact specification.

My invention relates to improved driving mechanism for motor vehicles and particularly to what is known as four-wheel drive machines, which are motor driven vehicles provided with the usual four carrying wheels, two front and two rear, all of which are positively driven from the motor.

It is a further object of the invention to provide improved steering mechanism for use in a motor vehicle and particularly in four-wheel drive motor vehicles.

The invention is applicable to motor driven vehicles for both agricultural road purposes, and the improvements in the driving gearing comprising my invention enables the power to be applied from the motor or other power sources throughout all the four wheels of the vehicle, thus increasing the traction by enlarging the traction surfaces and making the driving operation more uniform, while at the same time resulting in certain economies in the weight of the vehicle due to the proper distribution of the driving mechanism.

It is a further object of the invention to provide a driving mechanism for motor vehicles of the described character with a minimum amount of power transformations through gears to the four wheels of the vehicle and at the same time maintaining a relatively high speed in the motor or engine thereby attaining the known advantages of high speed motors, because of the reduction in the weights of the various parts of the motor and various transmission devices due to my being able to utilize relatively high speeds in motor and certain parts of the power transmission devices.

To attain these ends and to accomplish certain other new and useful ends the invention consists in the features of novelty hereinafter described, depicted in the accompanying drawing, and finally more particularly set forth in the appended claims.

In the said drawing Figure 1 is a plan view of a chassis of a tractor or truck embodying my invention with certain parts broken away and other parts in section to disclose certain details of construction. Fig. 2 is a broken elevation view of one end of the chassis of Fig. 1 showing the detail of construction of the front and rear axles.

In the drawing the vehicle frame is designated by the reference character 10. The axles of the vehicles are designated by the reference character 11, and are alike in construction at each end of the vehicle being preferably in the form of forgings of solid and sturdy construction with their extremities expanded and bifurcated as indicated at 12 Fig. 2 for the purpose of pivotally supporting stub axles 13 which are pivotally connected thereto to enable each of the four wheels to be turned relative to its supporting axle so that each of the four wheels of the vehicle is a steering wheel as well as being capable of exerting a tractive effort upon the application of power through the driving gearing as will be presently described. The four wheels of the vehicle are each designated by the reference character 14, since they may be all alike in construction as shown in the drawings. The pivoted stub axles 13 of the vehicle wheels 14 are controlled in pairs at the front and rear or at the extremities of the vehicle in the usual manner by the usual reach rods as indicated by the reference character 15. The connections at the extremities of these rods with the usual arms on the pivoted stub axles being designated by the reference character 16. A convenient method of constructing the pivot axles is shown in the drawings, a sectional view through one of the wheel hubs and axle being shown in Fig. 1 at the upper right hand wheel, the section being on the line B—B of Fig. 2, from which it will be seen that the stub axle 13 is formed integrally with or rigidly secured to a casing 13$^a$, which has an ear on the exterior of the casing forming a pivotal connection at 16 with the reach rods 15. There is also a projecting arm that is secured rigidly with or cast upon the casing 13$^a$ so that there may be a connection between the front and rear pairs of wheels. Such arms are designated by the reference character 13$^b$ and connecting same is the longitudinal reach rod 17 connected to the arms 13$^b$ at 18. The wheels of the vehicle being thus connected it will be seen that any turning movement imparted to any one of the wheels for steering will be synchronously imparted to each of the four wheels, and the fact that the pairs of wheels at the extremities of the vehicle are connected by the diagonal reach rod connection, the turning movement of each pair of the wheels will be synchronously in the opposite direction in order to facilitate steering and enable the machine to be turned on a relatively short radius when desired. The connections with the steering wheel or lever may be of any usual or desired construction and may be arranged at any desired part of the machine. For example a suitable hand steering device may be hooked up with or operatively associated with the fragmentary steering connection shown attached to the diagonal reach rod 17 as indicated by the reference character 19, or obviously the steering connection may be through either of the reach rods 15 or operatively connected with any other moving part connected to move synchronously with the stub axles 13. The casings 13$^a$ at the hinged end of the axles 13 serve also as closures around worm gearing, operatively connected with the hubs of each of the wheels 14, to be presently described.

Obviously the main frame 10 which is shown supporting the motor casing 20 and the differential and power transmission devices operatively connected therewith should have suitable connections with the axles 11. These connections which form no part of the invention have not been shown in the drawings in order to avoid complications, but may be in the form of the ordinary spring suspension devices by which vehicle main frames are supported upon the axles as is common in this art.

The motor casing 20 is of the conventional form of multi-cylinder gas or gasolene engine although it will be obvious that the engine may be utilized with other forms of motor power. The motor main frame 20 is shown attached to the vehicle main frame 10 and supported thereby and having a transmission gear casing 21 forming an extension at one end thereof, there being also an enlarged narrow casing 22 adapted to take the usual fly wheel and clutch mechanism under the control of the conventional clutch lever designated by the reference character 23. Obviously the crank shaft of the motor 20 will be operatively connected through the clutch mechanism within the casing 22 and the power transmission gearing within transmission casing 21 under the control of the conventional gear shift lever 24 so that an operator may at will cause the power of the motor to be transmitted at the desired speeds and in the desired direction through the universal joint as indicated by the reference character 25 to the power transmitting shaft 26, which latter is journaled in bearings 27, 28 shown in Fig. 1 as supported in or forming a portion of the walls of the closed gear casing 29 extending laterally between and supported by the longitudinal side rails of the main frame 10. Loosely journaled upon the drive shaft 26 within the casing 29 are the spur driving gears 30, 31, the former having secured thereto or formed integrally therewith, the bevel or face gear 32 and the latter being provided with a similar bevel or face gear 33. Keyed to shaft 26 between the bevel or face gears 32, 33 is a yoke having a plurality of pivot pins as indicated at 34, the latter carrying bevel pinions each adapted to synchronously engage the adjacent teeth of the bevel gears 32, 33. Countershafts 35, 36 are journaled in suitable bearings as indicated at 37 to 40 inclusive and the former shaft carries spur gear 41 engaging spur gear 31 of the differential gearing while shaft 36 has secured thereto the spur gear 42 in constant engagement with the differential spur gear 30. In Fig. 1 the drive shaft 26 is shown provided with a brake drum 43 secured to rotate therewith on the exterior of the power and transmission casing 29 adapted to be controlled by a suitable hand or foot operated brake shoe of which a fragmentary view is shown in section and designated by the reference character 44.

The power transmission countershafts 35, 36 extending outwardly at each end thereof through their supporting bearings in casing 29 are provided with universal and slip joint connections as indicated at 45 to 48 inclusive, Fig. 1. Extending from the universal and slip joint connections 45 to 48 inclusive are the driving shafts 49 to 52 inclusive which communicate with the worm driving devices connected with each of the driving wheels 14, for the purpose of imparting the movement of the power transmission countershafts 35 36 to the pair of driving wheels 14 on the adjacent side of the vehicle. The details of construction of the worm driving mechanism are illustrated in the sectional views taken on the lines A—A, B—B, of Fig. 2 as shown in the axle adjacent the motor end of the vehicle as it appears in the plan view Fig. 1. The casing of the axle spindle 13 is enlarged to provide a housing 13$^a$ for the worm gear 14$^b$ secured to or formed integrally with the hub 14$^a$ of the wheels 14. Preferably at the lower part of the casing 13$^a$ in order to insure better lubricating qualities to the driving connections, especially when the vehicle is driven at comparatively low speeds as when it is employed as a farm tractor for plowing and other agricultural purposes necessitating its use at comparatively slow speeds, there is provided a supplemental enlargement or housing 13$^b$ having alining bearings to receive the worms or spiral gears as designated by the reference character 53, Fig. 1. The spirals or worms 53 are connected by universal joints as indicated at 54 with each of the driving shafts 49 to 52 inclusive and at the same time engaging the worm gears 14^b for driving the wheels 14.

This construction of worm gearing shown with the worms in the lower part of the gear casing 13^a, 13^b and engaging the lower peripheries of the worm gears 14^b insures for the reasons stated an adequate supply of lubricant to the surface of the gearing which receives the greatest thrust or pressure in the transmission from the driving shafts 49 to 52 inclusive.

The operation of my improved driving gearing will be apparent from the description of mechanism as above set forth but it should be pointed out that by the arrangement of devices as herein set forth I attain certain new and beneficial results. Utilizing as I do the four wheels of the vehicle for imparting the tractive effort thereto instead of the ordinary two-wheel drive I am enabled by distributing the driving power to the four wheels of the vehicle to lessen the strain upon the driving connections by at least 50% over the strains inherent in a construction in which the driving power is imparted to only a single pair of driving wheels. Furthermore by the use of the differential in an inclosed casing carried on the main frame of the machine I am enabled to dispense with the common divided axle construction and the complications that necessarily follow in mounting the differential gearing within a casing carried upon the axle. By my construction it will be seen that I avoid the necessity of separate sets of differentials for the front and rear axles, which are often used in four-wheel drives.

In operating a machine as above described the person manipulating the gear shift lever 24 will from his position upon the machine shift the transmission gearing to attain the speed in the direction of rotation of the driving shaft 26 that may be desirable for propelling the vehicle in the desired direction and at the selected speed. Then by letting in the clutch and connecting the motor to impart its power to the shaft 26 the gears 30, 31 will be rotated through the differential gearing described and these in turn through the respective trains of the gears 30, 42 and 31, 41 will impart rotation to the supplemental driving shafts 35, 36 and thence to all four of the driving wheels 14 through their respective driving shafts 49 to 52 inclusive and the worm gearing devices described.

The brake drum 43 and braking device 44 being positively connected with the traction wheels 14 of the machine will afford frictional means for applying a braking effect upon the machine. If resilient suspension devices be arranged between the axles 11 and the main frame 10 of the machine compensating devices are necessary for preventing binding in the connections between the universal joints adjacent the worm gear drive on the wheel axles and the power transmission casing on the main frame. This may be in the form of a slip connection between the shafts 49 to 52 inclusive and that portion of the universal joint connection with which it is associated. For example the universal joint connection may be provided with a socket of irregular cross section and coöperating with the end of the shaft formed in a similar manner to slide longitudinally therein but not rotatably mounted in the socket, thus permitting any desired lengthening or shortening in the connection between the respective universal joints adjacent the gear casing and the worm gear driving mechanisms.

Another advantageous feature of my construction is due to the fact that I not only employ the solid axle construction front and rear but flexibly mounting each of the four wheels of the vehicle for movement in turning enables me to turn a vehicle of a given wheel base in a much shorter radius than is the case with the ordinary vehicle steered from a single pair of flexibly mounted wheels.

In order that the invention might be understood the details of the preferred embodiment have been shown and described but I do not desire to be limited to these details for it will be apparent that persons skilled in the art may vary these details greatly without departing from the purpose and spirit of the invention.

I claim:

1. In a motor vehicle, the combination of a main frame, a pair of separated solid axles, traction wheels operatively connected with the extremities of each of said axles, a motor on the main frame, power transmitting devices operatively connected with the motor and mounted on the main frame, and comprising a power shaft, a pair of countershafts rotatably supported upon the main frame in parallelism with said power shaft, gears on each of said countershafts in engagement with differential gearing on the driving shaft, and flexible driving connections between the said countershafts and each of said traction wheels, said flexible connections and said power transmitting devices being adapted to operate the respective traction wheels on each side of the machine in synchronism with each other.

2. In a motor vehicle, the combination with a motor of solid axles spaced apart, stub axles pivotally secured to the extremities of said axles, traction wheels journaled on each of said stub axles, a power shaft arranged approximately at right angles to the said axles, countershafts in parallelism with said power shaft and located between said axles, spur gearing interposed between the power shaft and each of said countershafts, and flexible driving connections between each of the said parallel countershafts and the driving wheels on the respective pivoted stub axles.

3. In a motor vehicle, the combination with a motor of solid axles spaced apart, stub axles pivotally secured to the extremities of said stub axles, traction wheels journaled on each of said axles, a power shaft arranged approximately at right angles to the said axles, counter shafts in parallelism with said power shaft and located between said axles, spur gearing interposed between the power shaft and each of said countershafts, and flexible driving connections between each of said parallel countershafts and the driving wheels on the respective pivoted axles including worm gearing engaging each of said driving wheels.

4. In a motor vehicle the combination with a motor of axles spaced apart, stub axles pivotally secured to the extremities of one of said axles, traction wheels mounted on each of the axles including the said pivoted stub axles, a power shaft arranged approximately at right angles to said axles, countershafts in parallelism with said power shaft and located between said axles, spur gearing interposed between the power shaft and each of said countershafts, flexible driving connections between each of said parallel countershafts, and the driving wheels on the respective axles, said driving connections including worm gearing engaging each of said driving wheels, and steering devices operatively connected with the said pivoted stub axles for controlling the wheels carried thereby.

5. In a motor vehicle, the combination with a motor, axles spaced apart, traction wheels on the ends of said axles, a differential or compensating gearing having its axis at right angles to the axes of said axles, a pair of countershafts operatively connected with said gearing, and power transmitting devices interposed between said countershafts and each of said traction wheels, whereby the traction wheels on each side of the vehicle will by reason of the compensating gearing rotate synchronously.

6. In a motor vehicle, the combination of a motor, axles spaced apart, traction wheels rotatably supported at the ends of said axles, a differential or compensating gearing having its axes at right angles to the axes of said axles, a pair of countershafts arranged approximately parallel with the axis of said differential or compensating gearing, spur gearing operatively connecting said differential or compensating gearing and each of said countershafts, and power transmitting devices connecting said countershafts with each of said traction wheels whereby the traction wheels on each side of the vehicle will by reason of the compensating gearing rotate synchronously.

7. In a motor vehicle, the combination of a motor, axles spaced apart, traction wheels rotatably mounted at the ends of said axles, a motor shaft, a differential or compensating gearing arranged with its axis coaxially with the axis of the motor shaft, and power transmitting devices interposed between the differential or compensating gearing and each of said traction wheels whereby the traction wheels on each side of the vehicle will by reason of the compensating gearing rotate synchronously.

8. In a motor vehicle, the combination with a motor, of axles spaced apart, traction wheels rotatably mounted at the ends of said axles, a motor shaft arranged at approximately right angles to the axis of the said axles, a differential or compensating gearing having its axis arranged co-axially with the axis of said motor shaft, a pair of countershafts arranged approximately parallel with the motor shaft adjacent the said differential or compensating gearing, connecting power transmitting devices between the extremities of each of said countershafts and the adjacent traction wheels, and spur gears interposed between said countershafts and the variable parts of said compensating or differential gearing whereby the traction wheels on each side of the vehicle will by reason of the compensating gearing rotate synchronously.

9. In a motor vehicle, the combination with a motor of axles spaced apart, stub axles pivotally secured to the extremities of said axles, traction wheels mounted on the said stub axles, a power shaft operatively connected with the motor and arranged approximately at right angles to the said axles, a differential or compensating gearing arranged with its axis coincident with the axis of the power shaft, countershafts arranged in parallelism with said power shaft adjacent said differential or compensating gearing, a pair of spur gears, one of which is operatively connected with each of the variable parts of the differential or compensating gearing, spur gears mounted on the countershafts and engaging said spur gears of the differential, and flexible driving connections between each of said countershafts and the driving wheels on their respective stub axles whereby the wheels on each side of the vehicle will rotate synchronously.

10. In a motor vehicle, the combination with a motor, of axles spaced apart, stub axles pivotally secured to the extremities of said axles, traction wheels mounted on the said stub axles, a power shaft operatively connected with the motor and arranged approximately at right angles to the said axles, a differential or compensating gearing arranged with its axis coincident with the axis of the power shaft, countershafts arranged in parallelism with said power shaft adjacent said differential or compensating gearing, a pair of spur gears, one of which is operatively connected with each of the variable parts of the differential or compensating gearing, spur gears mounted on the countershafts and engaging said spur gears of the differential, and flexible driving connections between each of said parallel countershafts and the driving wheels on their respective stub axles whereby the wheels on each side of the vehicle will rotate synchronously, said driving connections including worms operated by said flexible driving connections and gears secured to the wheels and coöperating with said worms.

11. In a motor vehicle, the combination with a main frame, of a motor, axles spaced apart, stub axles pivotally secured to the extremities of one of said axles, traction wheels mounted on each of the axles including the said pivoted stub axles, a power shaft operatively connected with the motor, a differential and power transmission casing supported by the main frame, independently of the vehicle axles, bearings in said casing for supporting an extension of said power shaft, the latter being arranged approximately at right angles to the axes of the said axles, differential or compensating gearing arranged co-axially on the last said shaft within the said casing, a pair of countershafts journaled in said casing, spur gearing interposed between said countershafts and variable parts of said differential or compensating gearing and flexible driving connections extending from the extremities of said countershafts to each of said traction wheels.

12. In a motor vehicle, the combination with a main frame of a motor, the said motor being arranged on the main frame with the axis of its crank shaft approximately parallel with the longitudinal axis of the main frame, axles spaced apart, stub axles pivotally secured to the extremities of said axles, traction wheels rotatably mounted on each of said stub axles, a power transmission casing secured to the main frame independently of the vehicle axles, a power shaft within said casing, means for operatively connecting said power shaft with the motor crank shaft, countershafts rotatably mounted in said casing, there being extensions of said countershafts on the outside of said casing at the front and rear sides thereof, differential or compensating gears mounted co-axially of the power shaft on the interior of the casing, spur gears rigidly connected with said differential or compensating gearing, other spur gears connected with said countershafts and engaging said differential or compensating spur gears, and flexible driving connections between the extremities of said countershafts and each of the traction wheels of the vehicle.

13. In a motor vehicle the combination with a motor, of axles spaced apart, stub axles pivotally secured to the extremities of said axles, traction wheels mounted on each of the stub axles, a power shaft arranged approximately at right angles to said axles, a gear box arranged between the two axles and being provided with bearings for the power shaft, countershafts in the gear box in parallelism with said power shaft, the said countershafts having extensions fore and aft of the gear box, spur gearing interposed between the power shaft and each of said countershafts within the gear box and including differential or compensating gearing, flexible driving connections between each of said parallel countershafts and the driving wheels on the respective axles, the said flexible connections extending from the fore and aft extensions on each countershaft to the front and rear wheels on the corresponding side of the machine whereby the wheels on each side of the machine will be driven in synchronism independently of the front and rear wheels on the opposite side of the machine, the said driving connections including worm gearing engaging each of said driving wheels, and steering devices operatively connected with the said pivoted stub axles for controlling the wheels carried thereby.

In testimony whereof I have signed my name to this specification, in the presence of two subscribing witnesses, on this 19th day of February, A. D. 1918.

EDMUND JOSEPH KANE.